United States Patent
Henneken

(10) Patent No.: US 6,931,924 B1
(45) Date of Patent: Aug. 23, 2005

(54) METHOD FOR TESTING THE FUNCTION OF AN ELECTROHYDRAULICALLY CONTROLLED AUTOMATIC TRANSMISSION

(75) Inventor: Markus Henneken, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/031,351

(22) PCT Filed: Jul. 15, 2000

(86) PCT No.: PCT/EP00/06779

§ 371 (c)(1),
(2), (4) Date: Jan. 17, 2002

(87) PCT Pub. No.: WO01/07802

PCT Pub. Date: Feb. 1, 2001

(30) Foreign Application Priority Data

Jul. 22, 1999 (DE) ................................ 199 34 486

(51) Int. Cl.⁷ .......................................... G01M 19/00
(52) U.S. Cl. ....................... 73/168; 73/168; 73/118.1; 475/123; 477/166
(58) Field of Search ............... 73/168, 118.1; 477/166; 475/123

(56) References Cited

U.S. PATENT DOCUMENTS

| | | | |
|---|---|---|---|
| 4,356,724 A * | 11/1982 | Ayoub et al. ............... | 73/118.1 |
| 4,742,461 A | 5/1988 | Eschrich et al. .......... | 364/424.1 |
| 5,594,643 A * | 1/1997 | Birchenough et al. ........ | 701/51 |
| 5,737,979 A | 4/1998 | McKenzie et al. .......... | 74/731.1 |
| 6,146,305 A * | 11/2000 | Hebbale et al. ............. | 475/284 |
| 6,155,948 A | 12/2000 | Gierer ........................ | 475/123 |
| 6,332,517 B1 * | 12/2001 | Zimmermann .............. | 192/3.3 |

FOREIGN PATENT DOCUMENTS

| | | | |
|---|---|---|---|
| DE | 43 28 537 A1 | 3/1995 | .......... G01M 13/02 |
| DE | 34 36 190 C2 | 6/1995 | .......... F16H 61/08 |
| DE | 196 43 305 A1 | 4/1998 | .......... F16H 61/00 |
| EP | 0 430 296 A2 | 6/1991 | .......... G01M 13/02 |
| JP | 08043259 A | 2/1996 | .......... G01M 13/02 |
| WO | 98/17929 | 4/1998 | .......... F16H 61/04 |

OTHER PUBLICATIONS

Müller, Ing. (grad.) Peter, "Vollautomatisierte Qualitätssicherung durch Prozessrechner in der Automatgetriebe-Fertigung,"*ATZ Automobittechnische Zeitschrift* 79 (1977) 1, pp. 17-20.

Hüther, Dipl.-Ing. H., "Messungen am kontinuierlich verstellbaren Automatikgetriebe (CTX) im Prüfstands- und Fahrbetrieb", *VDI Berichte* (1988), 681, pp. 207.

* cited by examiner

*Primary Examiner*—Hezron Williams
*Assistant Examiner*—André K. Jackson
(74) *Attorney, Agent, or Firm*—Davis & Bujold, P.L.L.C.

(57) ABSTRACT

The method for testing the function of an electrohydraulically controlled automatic transmission upon a testing stand by simulation of a vehicle operation provides that the output shaft of the transmission be connected with a stationary torque-measuring hub and be blocked thereby; the shifting elements existing in the transmission are tested when the output shaft is blocked with an input rotational speed which is precisely sufficient to supply with hydraulic pressure the pressure setting members for the shifting elements. As characteristic quantity can be used the setting member current at which the shifting element slips or at which the slip tends toward zero when the shifting element closes.

10 Claims, 1 Drawing Sheet

METHOD FOR TESTING THE FUNCTION OF AN ELECTROHYDRAULICALLY CONTROLLED AUTOMATIC TRANSMISSION

FIELD OF THE INVENTION

This invention relates to a method for testing on a testing stand the function of an electrohydraulically controlled automatic transmission by simulation of a driving operation, the input shaft of the transmission being connected with a driving machine which produces preset rotational speeds and load ratios.

BACKGROUND OF THE INVENTION

In the production in series of electrohydraulic automatic transmissions, there occurs within one an the same series of dispersion through different components and parts. This can result in the driving comfort failing differently in two identical automatic transmissions.

Therefore, it is customary in the production in series of such transmissions to test the function upon a testing stand which simulates a vehicle operation, specific rotational speeds and load ratios being simulated by means of driving and driven machines in order then to control a gear change. The gear change is tested in the cycle according to a preset specification with reference to measuring data of input and output rotational speeds and torque sensors. Said test requires the interconnection for the transmission under dry circuit prior to the test proper for ventilating the clutches and pipes so as to obtain a reproducible test run of the power shifts.

To obtain the most uniform possible driving comfort in the different transmissions of a series, it has already been proposed in DE-C 34 36 190 to use in the electronic control of the transmission adaptive functions. This is done by means of a device for electronic control wherein the electrohydraulically actuatable friction elements in the transmission produce the change between the different reduction steps and an actual value that characterizes the shifting operation, specially the grinding time, shifting time, or the rotational speed gradient during the grinding time, is compared with a stored nominal value, a correction value being stored when a presettable divergence is exceeded. This correction value has for the subsequent shifting operations a correcting effect in the sense of the adaptive control upon the formation of a control valve for the friction elements, specially the hydraulic pressure. This device is specially adequate for automatic transmissions which as consequence of a defect have to be changed in a service workshop, a since otherwise the adaptive data stored in the electronic transmission control no longer coincide with the actual mechanical part fo the automatic transmission.

A method for determining characteristic quantities of an electrohydraulically controlled automatic transmission on a testing stand with quick tying of the electronic control has been disclosed in the Applicant's WO 98/17929. Here gear shifts are successively initiated upon a testing stand in the individual reduction steps of the automatic transmission. During the gearshifts a transmission input and a transmission output rotational speed, the same as a transmission input and a transmission output torque and the timed curves thereof are measured. From said measured values are determined as characteristic quantities of the automatic transmission for the clutch to be engaged during the gear change, a filling time, a charge pressure, a reaction time, a frictional value of the disks and a pressure liquid charge. Said characteristic quantities are thereafter stored in a memory so that the electronic transmission control unit can correct, according to said characteristic quantities, the pressure level and the time of the rapid filling pressure of the charge pressure, the same as the pressure level of the shifting pressure.

Hereby the whole tolerance chain can be tested so that control and transmission tolerances be entirely detected. This leads to greater tolerances of the parts and thus to a less costly production. Since the values that characterize the respective transmission are stored in a memory, there is obtained in the electronic transmission control unit, even in case of great divergences between actual and nominal values, a quicker coincidence of the actual and nominal values. But a dry interconnection of the automatic transmission prior to the actual test for ventilating the clutches and pipes is also required here.

The problem on which this invention is based is to provide a method of the kind mentioned above in which, without separate ventilation of the hydraulic components and within a shorter time, the function of the transmission can be tested from the production in series.

BRIEF DESCRIPTION OF THE DRAWING

Further advantages and developments of the invention will now be described, by way of example, with reference to the accompanying drawings in which.

SUMMARY OF THE INVENTION

It has been found that the advantage obtained with the inventive method is that a very great saving of time in the order of 80% can be achieved. There is further obtained the advantage that during the test of an automatic transmission with the inventive method, by eliminating the dynamic portions which were formerly required, the errors can be better detected whereby the quality of the driving comfort is further enhanced. By associating "adjusted current" with "transmitted torque" it is possible qualitatively to make very accurate statements about the quality of the shifting functions of the automatic transmission. Tolerances between the separate automatic transmissions of one and the same series can be compensated by a balance of tolerance with storing of the data in the electronic transmission control whereby the quality for the end product is still further improved.

Figure 1:
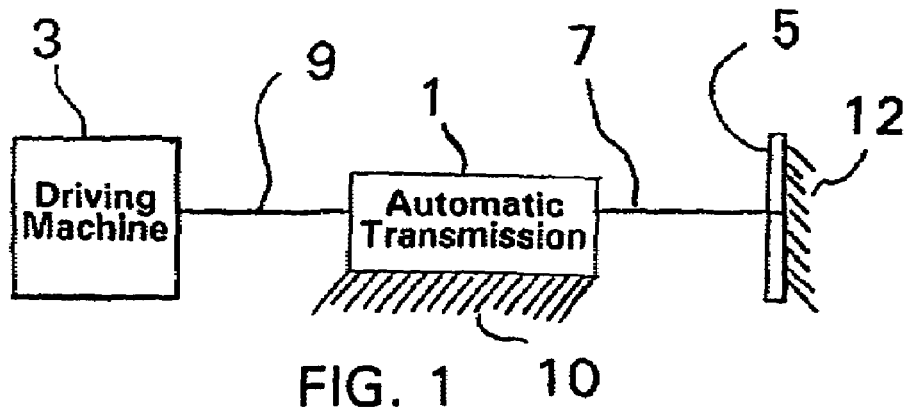
FIG. 1 is a diagrammatic representation of the testing device upon which the described method for testing the function of an electrohydraulically controlled automatic transmission is based according to the invention.

Therefore, as shown in FIG. 1, the invention provides that the automatic transmission 1 be tested upon a testing stand with a driving machine 3 of less power and with a torque measuring hub 5 instead of the driven machine. Accordingly, this test of the shifting elements existing in the transmission such as brakes and clutches is conducted while the output 7 is stationary and at a low input 9 rotational speed which is precisely sufficient to supply the pressure setting elements in the transmission with hydraulic pressure and ensure the operation thereof. According to the invention the shifting element to be tested is caused to slip via the pressure-setting element and then closed again. This procedure takes no more than two seconds and spares the separate ventilation of the hydraulic components prior to performing the test.

The characteristic quantity for the correct function of the shifting element tested the setting element current at which the shifting element slips or the slip tends toward zero when it closes.

One other characteristic quantity is the hysteresis of the current thresholds between the opening and closing of the shifting element, or the slip rotational speed of the shifting element, or also the torque transmitted to the torque-measuring hub.

Another characteristic quantity is the filling time needed in order to shift with positive engagement a shifting element. The flow rate thus determined that is actually absorbed is a measure for the tolerance of the air play, for the pressure supply and for the detection of errors (porosities, throttle positions . . . ).

An essential advantage, specially for an error search and a localization of causes of error, consists in that in the course of the testing method the shifting elements to be tested can be successively engaged, that is, the already shifted shifting elements remain closed and the new shifting element to be tested is shifted with positive engagement.

Figure 2:
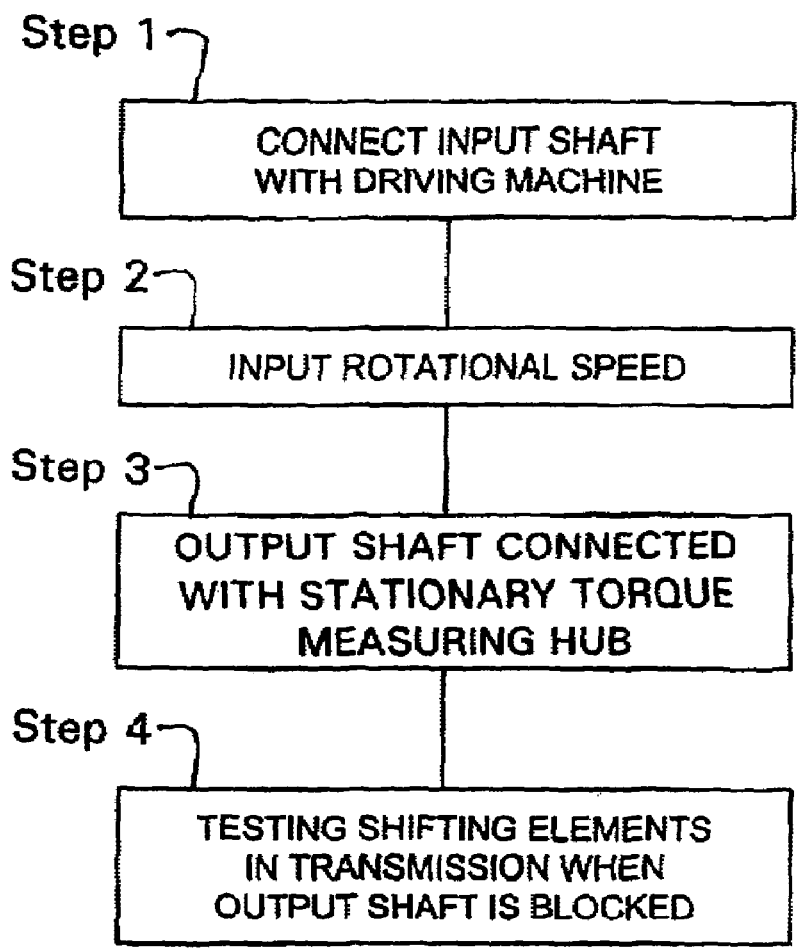
FIG. 2 is a simplified flow diagram illustrating the method of the present invention.

It has been found, by way of example, that in the testing of a five-step automatic transmission a saving of time of 80% was found during the testing with the inventive method as shown in FIG. 2. The method for testing the function of an electrohydraulically controlled automatic transmission upon a testing stand by simulation of a vehicle operation at step 1 wherein the input shaft of the transmission is connected with a driving machine which produces preset rotational speeds and load ratios at step 2, characterized in that the output shaft of the transmission is connected at step 3 with a stationary torque-transmitting hub and that shifting elements existing in the transmission are tested when the output shaft is blocked at step 4 with an input rotational speed which exactly suffices to supply with hydraulic pressure the pressure-setting elements for the shifting elements, a characteristic quantity being determined and indicated or stored.

To obtain the most uniform possible driving comfort in the different transmissions of a series, it has already been proposed in DE-C 34 36 190 to use in the electronic control of the transmission adaptive functions. This is done by means of a device for electronic control wherein the electrohydraulically actuatable friction elements in the transmission produce the change between the different reduction steps and an actual value that characterizes the shifting operation, specially the grinding time, shifting time, or the rotational speed gradient during the grinding time, is compared with a stored nominal value, a correction value being stored when a presettable divergence is exceeded. This correction value has for the subsequent shifting operations a correcting effect in the sense of the adaptive control upon the formation of a control valve for the friction elements, specially the hydraulic pressure. This device is specially adequate for automatic transmissions which as consequence of a defect have to be changed in a service workshop, a since otherwise the adaptive data stored in the electronic transmission control no longer coincide with the actual mechanical part of the automatic transmission.

Therefore, as shown in FIG. 1, the invention provides that the automatic transmission 1 be tested upon a testing stand 10 with a driving machine 3 of less power and with a torque measuring hub 5 mounted to a fixed part of a test bench 12 instead of to the driven machine. Accordingly, this test of the shifting elements existing in the transmission such as brakes and clutches is conducted while the output 7 is stationary and at a low input 9 rotational speed which is precisely sufficient to supply the pressure setting elements in the transmission with hydraulic pressure and ensure the operation thereof. According to the invention the shifting element to be tested is caused to slip via the pressure-setting element and then closed again. This procedure takes no more than two seconds and spares the separate ventilation of the hydraulic components prior to performing the test.

It has been found, by way of example, that in the testing of a five-step automatic transmission a saving of time of 80% was found during the testing with the inventive method as shown in FIG. 2. The method for testing the function of an electrohydraulically controlled automatic transmission upon a testing stand 10 by simulation of a vehicle operation at step 1 wherein the input shaft of the transmission is connected with a driving machine which produces preset rotational speeds and load ratios at step 2, characterized in that the output shaft 7 of the transmission is connected at step 3 with a stationary torque measuring hub 5 which is mounted to a fixed part of the test bench 12 and that shifting elements existing in the transmission are tested when the output shaft 7 is blocked at step 4 with an input rotational speed which exactly suffices to supply with hydraulic pressure the pressure-setting elements for the shifting elements, a characteristic quantity being determined and indicated or stored.

What is claimed is:

1. A calibration method for testing the function of an electrohydraulically controlled automatic transmission upon a test bench by simulating a vehicle operation, comprising the steps of:

connecting an input shaft of the transmission with a driving source having preset rotational speeds and load ratios;

connecting an output shaft of the transmission with a stationary torque-measuring hub that is separate from the transmission and that is mounted to a fixed part of the test bench and that blocks the output shaft; and individually testing each of a plurality of shifting elements existing in the transmission in succession to determine a characteristic quantify of each shifting element, including actuating each shifting element being tested while others of the shifting elements remain closed and determining the characteristic quantity of the shifting element being tested upon detecting a slip of the shifting element or a decrease of a slip of the shifting element, including providing an input rotational speed to the transmission to supply pressure-setting elements in the transmission with hydraulic pressure sufficient to actuate each shifting element being tested out of an opened condition to the extent necessary to determine, indicate and store a desired shifting element characteristic.

2. The method according to claim 1, further comprising the step of determining the desired shifting element characteristic quantity according to hysteresis of a current difference between opening and closing of the shifting element.

3. The method according to claim 1, further comprising the step of determining the desired shifting element characteristic quantity according to a slip rotational speed of the shifting element.

4. The method according to claim 1, further comprising the step of determining the desired shifting element characteristic quantity according to a torque transmitted to the torque measuring hub.

5. The method according to claim 1, further comprising the step of determining the desired shifting element characteristic quantity according to a time needed to shift a shifting element into positive engagement.

6. A calibration method for testing the function of an electrohydraulically controlled automatic transmission upon a test bench simulating a vehicle operation, comprising the steps of:
connecting an input shaft of the transmission with a driving source having preset rotational speeds and load ratios;
connecting an output shaft of the transmission with a stationary torque measuring hub that is separate from the transmission and that is mounted to a fixed part of the test bench and blocks the output shaft;
individually testing each of a plurality of shifting elements existing in the transmission in succession to determine a characteristic quantify of each shifting element, including
actuating each shifting element being tested while others of the shifting elements remain closed and determining the characteristic quantity of the shifting element being tested upon detecting a slip of the shifting element or a decrease of a slip of the shifting element, including
providing an input rotational speed to the transmission to supply pressure-setting elements in the transmission with hydraulic pressure sufficient to actuate each shifting element being tested out of an opened condition to the extent necessary to determine, indicate and store a desired shifting element characteristic, and
maintaining each of the shifting elements in a closed condition after testing.

7. The method according to claim 6, further comprising the step of determining the desired shifting element characteristic quantity according to hysteresis of a current difference between opening and closing of the shifting element.

8. The method according to claim 6, further comprising the step of determining the desired shifting element characteristic quantity according to a slip rotational speed of the shifting element.

9. The method according to claim 6, further comprising the step of determining the desired shifting element characteristic quantity according to a torque transmitted to the torque measuring hub.

10. The method according to claim 6, further comprising the step of determining the desired shifting element characteristic quantity according to a time needed to shift a shifting element into positive engagement.

* * * * *